United States Patent [19]
Klein

[11] 3,718,350
[45] Feb. 27, 1973

[54] SNAP RING COUPLING
[75] Inventor: Lee F. Klein, North Tonawanda, N.Y.
[73] Assignee: General Motors Corporation, Detroit, Mich.
[22] Filed: Sept. 27, 1971
[21] Appl. No.: 183,964

[52] U.S. Cl..............285/39, 285/321, 285/DIG. 22, 285/DIG. 25
[51] Int. Cl...............................F16l 21/00
[58] Field of Search.....285/321, 39, 344, 14, 1, DIG. 25, 285/82, DIG. 22

[56] References Cited
UNITED STATES PATENTS

| | | | |
|---|---|---|---|
| 3,345,085 | 10/1967 | Hanes | 285/321 X |
| 3,453,005 | 7/1969 | Foults | 285/DIG. 25 |
| 3,540,760 | 11/1970 | Miller et al. | 285/DIG. 25 |
| 3,381,983 | 5/1968 | Hanes | 285/321 |
| 3,455,578 | 7/1969 | Hanes | 285/321 X |

FOREIGN PATENTS OR APPLICATIONS

| | | | |
|---|---|---|---|
| 501,139 | 2/1951 | Belgium | 285/344 |

Primary Examiner—Thomas F. Callaghan
Attorney—J. L. Carpenter et al.

[57] ABSTRACT

A quick connect, snap ring coupling for conduits for fluids under pressure embodies a socket and plug which is inserted into the socket and which is in sealing relation with the socket when fully inserted therein. The plug carries a split retaining ring which is engagable in spaced apart annular shoulders in the socket for axial retention of the plug relative to the socket. The arrangement of the annular shoulders within the socket is such as to allow the plug to move axially outwardly with respect to a portion of the socket to an unsealed position to bleed the conduit of pressurized fluid after which the plug can be completely released from the socket.

4 Claims, 3 Drawing Figures

PATENTED FEB 27 1973 3,718,350

INVENTOR.
Lee F. Klein
BY Arthur N. Krein
ATTORNEY

SNAP RING COUPLING

This invention relates to a conduit coupling and, in particular, to a quick connect, snap ring coupling for conduits for fluid under pressure.

In various systems, conduits are connected together by suitable couplings, such as quick connect couplings, with fluid under pressure from a source of pressurized fluid, such as a compressor in an air conditioner system, so that even though the compressor may not be in operation, fluid under pressure may still be in the conduits when it is necessary to disconnect them from the source of pressurized fluid. To effect this disconnection of the conduits by means of a coupling, the coupling should be preferably constructed so that it can be partly disconnected so as to permit venting of fluid pressure from the conduits before the coupling is completely disconnected.

Accordingly, it is the primary object of this invention to improve a quick connect coupling for conduits which can be quickly connected together and which may be easily disconnected, with partial disconnection being automatically first accomplished to permit venting fluid pressure from the conduits before full disconnection can be made.

Another object of this invention is to provide a coupling for conduits which may be readily disconnected with the use of a simple tool and which has an intermediate disconnect position in which the pressure may leak off from the conduits but the coupling will not be forcibly disconnected by the pressure contained in the conduit system.

A still further object of this invention is to provide a simple and reliable snap ring coupling for connecting together tubular conduits.

These and other objects of the invention are obtained by means of a coupling including a socket member and a plug member which is inserted into the socket member, the plug being provided with an O-ring positioned in a groove therein and with an annular groove with a snap retaining ring positioned therein, the snap retaining ring being engagable against either one of a pair of shoulders formed by retaining ring receiving grooves provided in the socket. Radial apertures in alignment with the grooves in the socket permit a tool to be inserted therein to compress the snap retaining ring to permit disconnecting of the plug from the socket.

For a better understanding of the invention, as well as other objects and further features thereof, reference is had to the following detailed description of the invention to be read in connection with the accompanying drawings, wherein.

Figure 1:
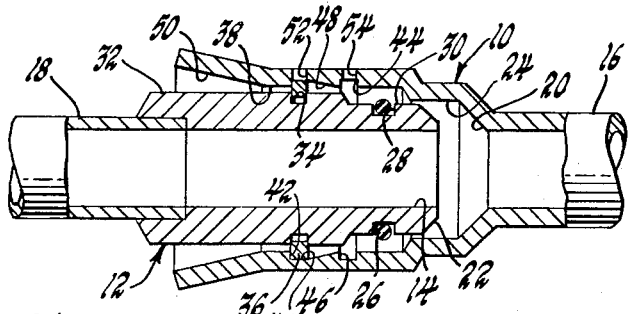
FIG. 1 is an axial view, with parts cut away in section of a coupling in partially released condition.

Referring to the drawings, the coupling of the invention comprises an annular outer female tubular member or socket 10 and an annular inner male tubular member or plug 12 with an axial bore 14 therethrough. The plug 12 is reciprocably received in the socket to couple two tubular conduits 16 and 18 together. These conduits may be, for example, flexible hoses or as shown, metal pipes and the conduits may be separate elements suitably attached to the coupling elements such as separate conduit 18 suitably connected to plug 12 or the conduits may be formed as integral parts of the coupling, as for example, conduit 16 and socket 10 formed as an integral element.

The socket 10 is provided with an internal conical wall 20 and the plug has a conical nose 22 which, when the device is fully connected, is positioned closely adjacent to the wall 20 but out of engagement therewith. The socket is also provided with a cylindrical bore 24 of reduced diameter which cooperates with an O-ring seal 26 mounted in a suitable annular groove 28 provided in the outer surface of tubular plug end portion 30 of reduced diameter of the plug. The O-ring seal 26 cooperates with the plug and the socket to prevent any leakage between the two when the plug is fully inserted into the socket to the position as shown in FIG. 2.

The plug 12 includes an enlarged tubular portion 32 rearwardly of the plug portion 30 having an annular groove 34 therein in which is positioned a split retaining ring 36, the depth of the groove 34 being such as to permit the split ring to be partly compressed therein so as to reduce its external diameter for a purpose which will become apparent.

Figure 2:
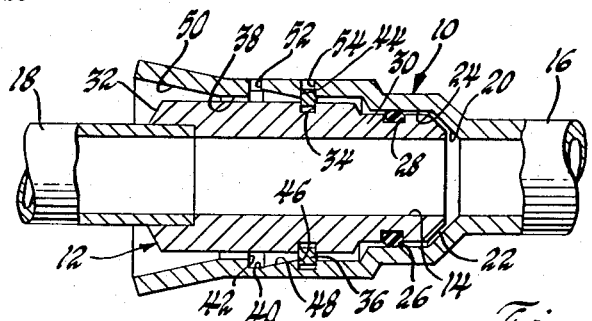
FIG. 2 is a similar view illustrating the coupling in fully coupled condition; and, FIG. 3 is an exploded axiometric view of the coupling in disconnected condition and of a tool used to effect disconnection of the coupling.

The socket 10 includes an enlarged bore 38 having an internal diameter larger than the external diameter of the annular portion 32 of the plug, and at its rear end, the right-hand end as seen in FIGS. 1 and 2, it is provided with an annular groove 40 having a rearward, radially extending wall 42 and a forward positioned annular groove 44 providing a second rearward, radial extending wall 46, the walls 42 and 46 forming shoulders engageable by the split ring 36 to axially position the plug within the socket and to prevent its movement in an axial direction to prevent disengagement of the plug from the socket. The forward edge of groove 40 has a tapered annular wall portion 48 to permit camming of the split ring 36 radially inward as the plug is pushed into the socket from the position shown in FIG. 1 to the position in FIG. 2.

In addition, the socket includes an enlarged tapered wall with a tapered bore 50 at its free end adjacent to bore 38 to provide an entrance taper for the plug and retaining ring, the angle of the entrance taper being preferably the same as the angle of the wall portion 48 between the grooves 40 and 44. The socket 10 is also provided with spaced apart radial apertures 52 and 54 intersecting the grooves 40 and 44, respectively, for a purpose to be described.

The plug 12 with the O-ring 26 and the retaining ring 36 attached thereto is assembled to the socket by merely inserting the plug into the socket and, by virtue of the entrance tapered bore 50 in the socket, the retaining ring 36 will be compressed to enter into the bore 38 of the socket and continued forward axial movement of the plug relative to the socket will result in the snap ring engaging the internal groove 40. This is the position as shown in FIG. 1. Again, further continued axial movement forward of the plug into the socket will cause the tapered surface of wall 48 between groove 40 and groove 44 to again compress the retaining ring 36 so that the plug can be moved axially relative to the socket until the retaining ring snaps into the annular groove 44 with the retaining ring then engaging the shoulder 46 to axially fix the plug relative to the socket, in this position, the O-ring 26 then being in sealing engagement between the socket and the plug.

Figure 3:
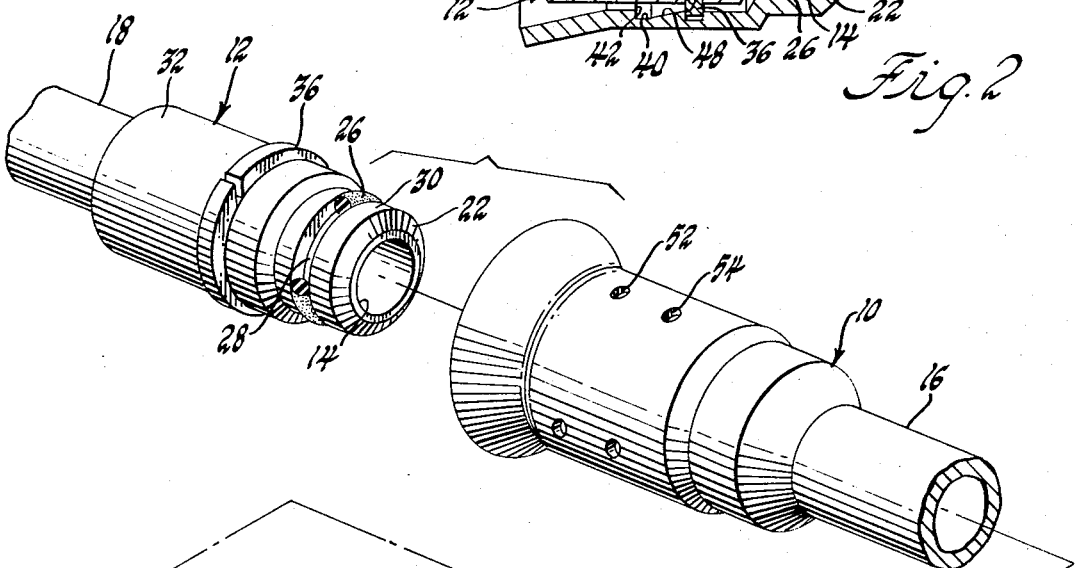
Figure 3:
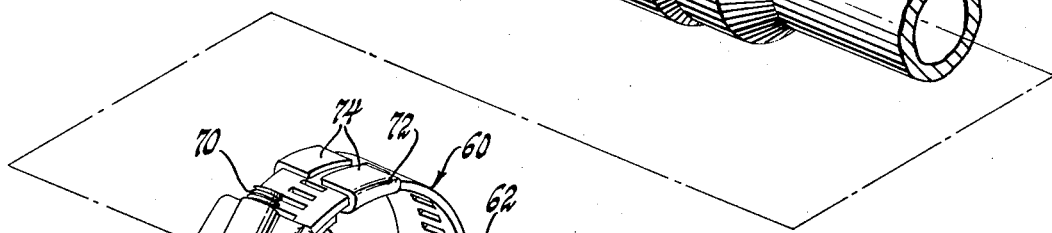
Figure 3:
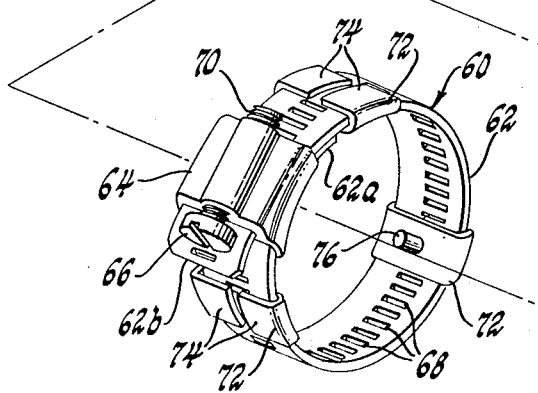

To disassemble the coupling of the invention, a detent tool similar to that shown in FIG. 3 is used to compress the retaining ring 36 to disengage it from either the shoulder 46 of groove 44 or from the shoulder 42 of groove 40 to permit axial withdrawal of the plug 12 from the socket 10. As shown in its assembled condition in FIG. 3, the detent tool, generally designated 60, is conveniently made in the form of a conventional worm drive, band-type hose clamp but with a plurality of sliding shoes having detent pins thereon for insertion into the apertures 52 and 54 of ths socket 10. As shown, the detent tool includes a clamping band 62, a housing 64 and a worm-type screw 66, the latter being rotatably secured in the housing, all of these elements forming part of a conventional band-type hose clamp which may be of the type, for example, as shown in U.S. Pat. No. 3,028,650 issued Apr. 10, 1962 to George C. Tinsley. The clamping band 62, made for example of flexible sheet metal, is provided with perforations or openings 68 which are cut therein at such an angle as to cooperate with the thread 70 of the band tightening screw 66 in a conventional manner. The band 62, for purpose of description, has a fixed end 62a to which the bottom of the housing 64 is secured, and a free end 62b which may be considered to be slidable relative to the fixed end.

In addition, the detent tool 60 is also provided with a plurality of sliding shoes 72, three such shoes being used in the embodiment shown. The shoes 72, made of any suitable material, are preferably provided with inturned flanges 74 to form a substantially compact C-shaped structure whereby the shoes can be slidably retained on the clamping band 62. The shoes 72 are provided on their inner faces with radially inward extending pins 76 adapted to be inserted into the apertures 52 and 54 of the socket so that these pins will engage the retaining ring 36 to compress it upon contraction of the clamping band 62 by means of the screws 66.

Assume that the plug 12 and socket 10 of the subject coupling are fully coupled together with the plug fully extended into the socket to the position shown in FIG. 2, with the O-ring 26 in sealing engagement between the plug and the socket. To disassemble the coupling, the band 62 is placed about the coupling so as to encircle the latter and the end 62b thereof is fed through the housing 64 so that the threads of screw 66 engage the walls of the opening 68 of the band. The detent tool 60 is then positioned relative to the socket so that the pins 76 on the shoes 72 will enter the apertures 54 therein upon tightening of the clamping band. As the clamping band is tightened, the pins 76 will engage the retaining ring 36 and upon further contraction of the resilient band, these pins will compress the retaining ring until it becomes disengaged from the shoulder 46 of groove 44 after which the plug 12 can be moved axially, to the left as seen in FIG. 2, to effect partial uncoupling of the plug from the socket. As the socket is moved to the left, the retaining ring will move out of engagement axially with respect to the pins 76 whereupon the retaining ring 36 is again free to expand radially outward into engagement with the internal tapered wall 48 of the socket so that as the plug is moved outward from the socket, to the left as seen in FIG. 2, the retaining ring will be in position to engage the radial wall 42 of groove 40, that is, to the position shown in FIG. 1. In this position of the plug with the socket, the O-ring seal 26 is out of sealing engagement with the plug and the socket so that any fluid pressure in conduits 16 and 18 can now bleed through the passage space now provided between the outer peripheral surface of the plug and the inner peripheral surface of the socket.

After any existing fluid pressure has been bled from the conduits, the detent tool can then be released and moved to a second position in which the pins 76 on the detent tool are now positioned for entry into the apertures 52 in the socket. Contraction of the clamping band 62 by screw 66 will again effect radial movement of the pins 76 whereby they engage and then compress the retaining ring 36 so that it is moved out of engagement with the wall 42 of groove 40 so that complete withdrawal of the plug from the socket can then be effected.

What is claimed is:

1. A fluid conduit coupling comprising, in combination, an outer tubular member defining a socket, a tubular plug member slidably received in said socket and in sealing relation to said socket when fully inserted therein, said socket having a first annular groove and a second annular groove in axially spaced apart relation to each other around the inner periphery of said socket, with a tapered annular wall therebetween, an annular groove around the outer periphery of said plug adapted to mate with said first annular groove in said socket when said plug is in sealing relation to said socket and, a split retaining ring positioned in said annular groove in said plug, said ring being of a size to enter the socket when compressed in said annular groove in said plug, said tapered annular wall being tapered so as to effect compression of said split retaining ring in said annular groove in said plug when it is moved axially from said second annular groove to said first annular groove in said socket, said second annular groove being positioned to mate with said annular groove in said plug when said plug is positioned axially in said socket in nonsealing relation thereto.

2. A fluid conduit coupling according to claim 1 wherein said socket includes radial apertures therethrough in alignment with both said first annular groove and said second annular groove to permit a tool to be inserted therein to compress said snap retaining ring.

3. A fluid conduit coupling including a tubular male member and a complementary tubular female member, said male member having a portion with an annular groove therein and a reduced diameter plug end portion with an annular seal ring receiving groove therein, a compressible O-ring seal positioned in said seal ring receiving groove, said tubular female member having a tapered bore portion at one end and a plug receiving bore at its other end with a bore therebetween having a first annular groove and a second annular groove therein with a tapered wall therebetween, said annular groove in said male member being adapted to mate with said first annular groove when said male member is positioned in said female member with said plug portion in said plug receiving bore with said O-ring seal in sealing engagement between said male member and said female member and to mate with said second annular groove when said O-ring seal on said plug portion is out of sealing engagement with said bore of reduced diameter, a split retaining ring in said annular groove, said retaining ring being of a size to enter said socket when compressed in said annular groove, the wall of said tapered bore portion of said socket being adapted to effect compression of said split retaining ring in said annular groove when said male member is inserted into said female member and, said tapered annular wall being tapered so as to effect compression of said split retaining ring in said annular groove when said plug is moved axially so that said annular groove therein is moved from mating relation with said second annular groove toward said first annular groove in said socket.

4. A fluid conduit coupling according to claim 3 wherein said female member has radial apertures therethrough in alignment with both said first annular groove and said second annular groove to permit insertion of the tool therein to compress said snap retaining ring.

* * * * *